United States Patent [19]

Kihara et al.

[11] Patent Number: 5,294,787
[45] Date of Patent: Mar. 15, 1994

[54] IMAGE SENSOR WITH PLURAL CENTRALLY LOCATED SENSOR MASKS

[75] Inventors: Osamu Kihara; Kensuke Sawase, both of Kyoto, Japan

[73] Assignee: Rohm Co., Ltd., Kyoto, Japan

[21] Appl. No.: 956,785

[22] Filed: Oct. 5, 1992

[30] Foreign Application Priority Data

Oct. 7, 1991 [JP] Japan .................................. 3-258838

[51] Int. Cl.⁵ .............................................. H01J 40/14
[52] U.S. Cl. .............................. 250/208.1; 250/237 R
[58] Field of Search ............................. 250/208.1, 237; 358/482, 483; 257/630, 432, 435, 444

[56] References Cited

U.S. PATENT DOCUMENTS 4,495,422  1/1985  Wiggins ............................. 250/578
5,162,644  11/1992  Nagata et al. .................. 250/208.1

Primary Examiner—David C. Nelms
Assistant Examiner—T. Davenport
Attorney, Agent, or Firm—Wolf, Greenfield & Sacks

[57] ABSTRACT

In an image sensor, a light receptor has a shield film formed substantially centrally in a light receiving area on each of a plurality of light receiving devices, except those disposed at opposite ends of each sensor IC, for adjusting the quantity of light received by each light emitting device. The result is that fluctuation of sensitivity and resolution failure, which might occur during the production of sensor ICs to be used as the light receptor, can be eliminated.

14 Claims, 4 Drawing Sheets

2

IMAGE SENSOR WITH PLURAL CENTRALLY LOCATED SENSOR MASKS

BACKGROUND OF THE INVENTION

1. Field of the Invention

This invention relates to an image sensor, and more particularly to an image sensor, for use in a facsimile machine, an image scanner, an optical character reader, etc., which comprises a light emitter for applying light to an objective, a condenser lens for condensing the reflected light from the objective, and a light receptor for receiving the light from the condenser lens.

2. Description of the Related Art

FIG. 1 of the accompanying drawings shows a typical conventional image sensor. The image sensor generally comprises a transparent cover (glass cover) 11 mounted on an upper portion of a frame 10, and an illumination base plate 13 mounted fixedly in the frame 10 and supported by a support strip 18. The illumination base plate 13 has a light emitter in the form of an array of light emitting devices 12 for applying light to a document or writing W as an objective placed on the transparent cover 11. Also disposed in the frame 10 is a rod-shape condenser lens 14 for condensing the light reflected from the document W and a sensor base plate 17 on which a light receptor in the form of a sensor IC 16, including at least one array of light receiving devices 15 is mounted.

In such an image sensor, the document W is brought into contact with the transparent cover 11 as conveyed by a platen roller 20 supported on an electric equipment such as a facsimile machine. The light from the light emitting devices 12 is applied to the document W on the transparent cover 11 at an angle of about 45 degrees with respect to the transparent cover 11. The applied light is reflected from the document W perpendicularly to the plane of the transparent cover 11. The reflected light is condensed by the condenser lens 14 and is then received by the sensor IC 16, which is disposed immediately under the condenser lens 14, where the light is converted into electrical signals.

As shown in FIGS. 2 and 3, the sensor IC 16 is a multitip type in which the light receiving devices 15 are arranged in the direction of scanning. In the sensor IC 16 of FIG. 2, there are provided, for example, 64 light receiving devices a1-a64 for 64 pixels. The reflective light from the document is converted into electrical signals by the light receiving devices a1-a64. The opto-electrically converted charges are inputted to a shift register 16a from electrodes E1-E64 and are then outputted as successive electrical signals.

At that time, for realizing a light receptor of both a high sensitivity and a high resolution, it is necessary to join and arrange the sensor ICs 16 in a line at high density. When dicing the sensor IC into a desired size in the Y direction, it has been a common practice to previously provide the sensor IC with a cutting margin so that the light emitting device contiguous to the cutting portion is prevented from being broken due to cracks developing from the cutting portion in the X direction. Consequently, considering the cutting portions and the joining portions of the individual sensor ICs, it has also been a common practice to define the scanning dimension of the sensor IC 16 such that the length (pixel width) of the two light emitting devices a1 and a64 at opposite ends of the sensor IC in the X direction is slightly smaller.

It is common knowledge that the distances between the individual light receiving devices 15 of the sensor IC 16 can not be made too short as its non-illustrated tight reinforcing pattern and wiring pattern are tight or dense.

Yet, if only the opposite end pixels adjacent to the cutting portion are reduced in width, the light receiving sensitivity from the opposite light receiving devices a1 and a64 will be lowered. To obtain an average sensitivity of all the light emitting devices, it is only necessary that the Y-direction pixels of the light receiving devices a1 and a64 are lengthened, thus lowering the resolution in the sub-scanning direction (Y direction) considerably. Specifically, the staggered Y-direction lengths of the light receiving devices cause some unrecognizable images so that resolution failure between the pixels (i.e. leaving part of the image blank) will occur. Consequently the pixel width of the light receiving devices at the opposite ends must be reduced. This reduction in the pixel width would, in turn, cause the irregular sensitivity so that even if a uniform quantity of reflective light strikes the entire light receptor, the image signals of the light receiving devices a1 and a64 at the opposite ends would be impaired in characteristics, compared to the image signals of the other light receiving devices a2-a63.

In the sensor IC 16 of FIG. 3, all the light receiving devices (b2-b63) except the opposite-end light receiving devices b1 and b64 are provided respectively with shield films 19 near the opposite side in the primary scanning direction (X direction) to adjust the light-receiving sensitivity of the sensor IC, thus retarding fluctuation of sensitivity of the entire light receptor. This causes the Y-direction pixel length of the light receiving device with the shield film 19 to be substantially shorter than that of the light receiving device without any shield film 19, thus lowering the sub-scanning-direction resolution of the receiving devices b2-b63. The image passing over the shield films 19 of the light receiving devices b2-b63 would be left blank at these portions to impair the inter-pixel resolution. This problem would also occur if the shield film 19 is situated near the opposite side in the sub-scanning direction (Y direction).

SUMMARY OF THE INVENTION

It is therefore an object of this invention to provide an image sensor having light receiving devices which are free from any fluctuation of light-receiving sensitivity of the light receiving devices and also any lowering of resolution, which might occur due to the shrinkage of size of sensor ICs resulting from their arrangement and/or due to the measures taken to prevent possible damage of the light receiving devices as they are diced during production.

In the image sensor of this invention, the light receptor has a shield film formed substantially centrally in a light receiving area of every light receiving device, except two at opposite ends of each sensor IC, for adjusting the quantity of light received by each light emitting device. With this arrangement, the light-receiving sensitivity of the light receiving devices at opposite ends of the sensor IC will be equalized to that of the other light receiving devices, thus eliminating any fluctuation of sensitivity. Furthermore since the shield film is located substantially centrally in the light receiving area, the Y-direction pixel length will not vary and so the sub-scanning-direction resolution will not be lowered.

DETAILED DESCRIPTION

An image sensor according to one embodiment of this invention will now be described with reference to the accompanying drawings.

Figure 1:
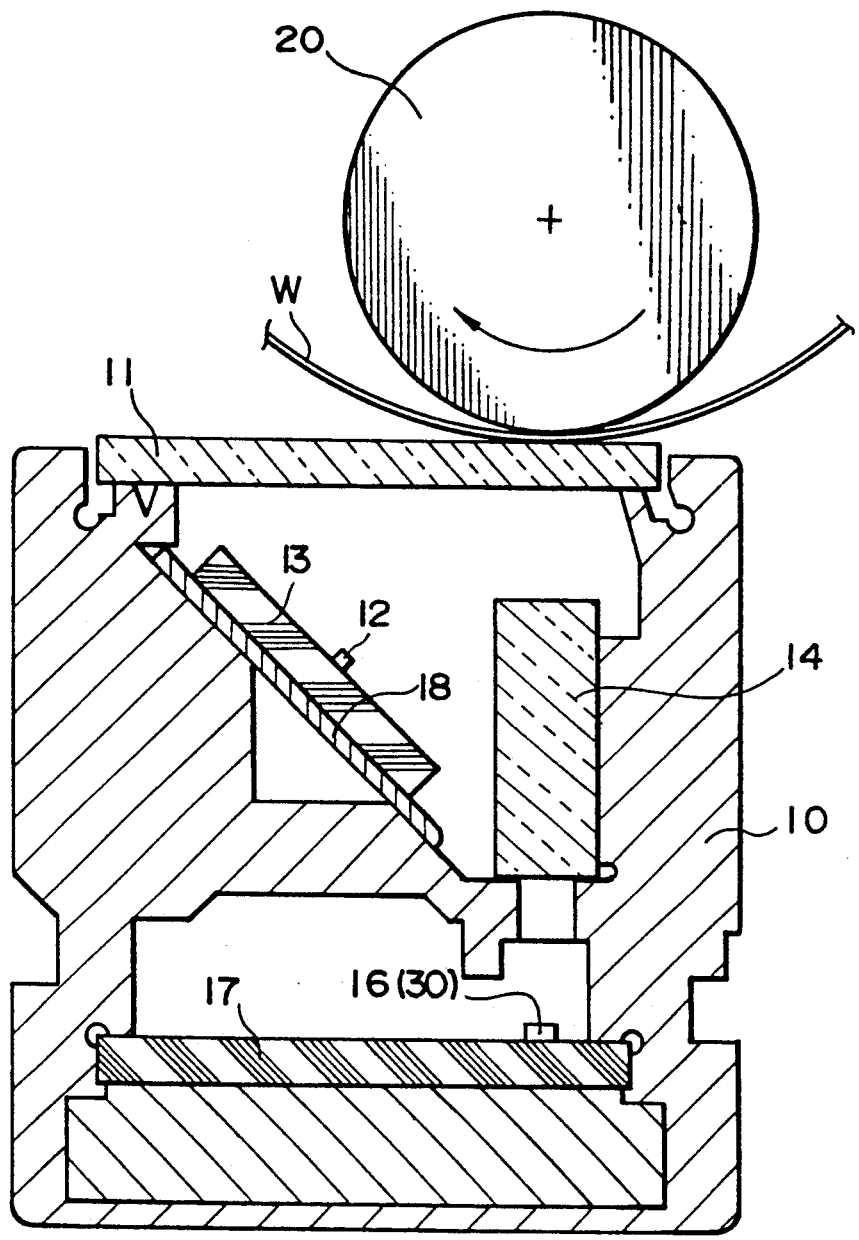
FIG. 1 is a fragmentary cross-sectional view of a conventional image sensor.
Figure 2:
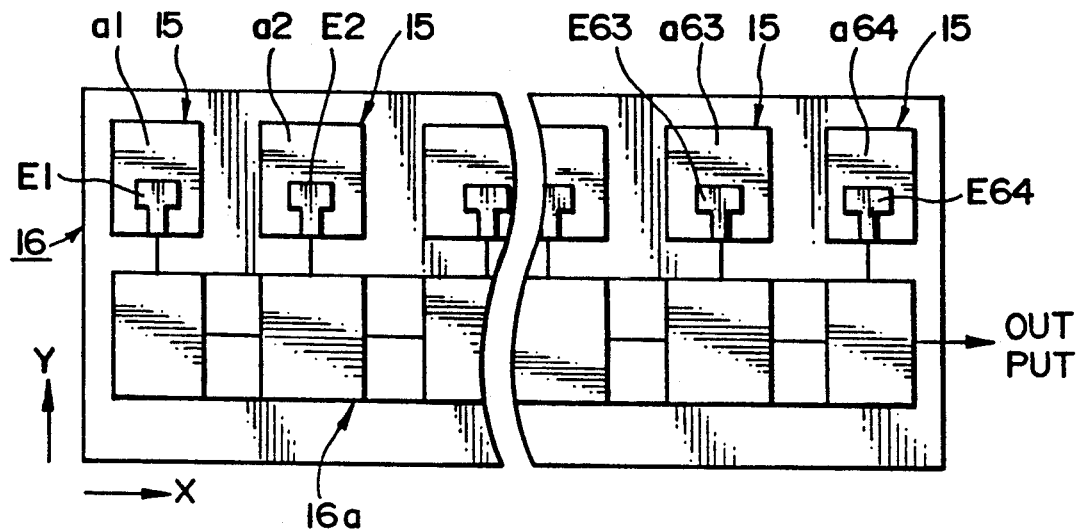
FIG. 2 is a plan view of a first-type of sensor IC constituting a light receptor to be mounted on the conventional image sensor.
Figure 3:
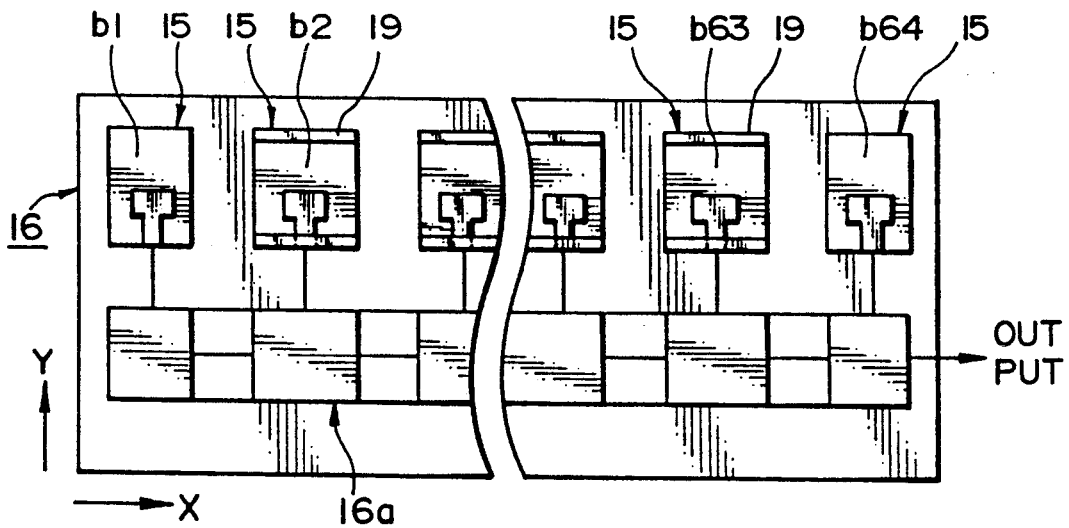
FIG. 3 is a plan view of a second-type of sensor IC constituting a light receptor to be mounted on the conventional image sensor.

The image sensor of this embodiment is totally identical in construction to the conventional image sensor, except for the light receptor section. Namely, as shown in FIG. 1, the image sensor of this embodiment comprises a transparent cover 11 mounted on the top portion of a frame 10, and an illumination base plate 13 which is mounted nearly centrally in the frame 10 and on which a light emitter in the form of an array of light emitting devices 12 is mounted. In the lower portion of the frame 10, a sensor base plate 17 is mounted. On the sensor base plate 17, a light receptor in the form of an array of sensor ICs 30 each including light receiving devices 31 is mounted. The illumination base plate 13 is fixedly secured to a support strip 18, which is attached to the frame 10, in an inclined position with respect to the transparent cover 11. A rod-shape condenser lens 14 is mounted centrally in the frame 10 and is fixedly secured to the frame 10 perpendicularly to the transparent cover 11 and the sensor base plate 17, thus having its optical axis extending vertically.

In this image sensor, the document W is brought onto the transparent cover 11 by a platen roller 20 supported by an electronic equipment such as a facsimile machine. The light emitted from the light emitting devices 12 is applied to the document W on the transparent cover 11 at an angle of about 45 degrees with respect to the transparent cover 11. The light reflected by the document W perpendicularly to the transparent cover 11 is condensed by the condenser lens 14, and the condensed light is received by a sensor IC 30 right under the condenser lens 14, whereupon the light corresponding to the image is converted into electrical signals.

Figure 4:
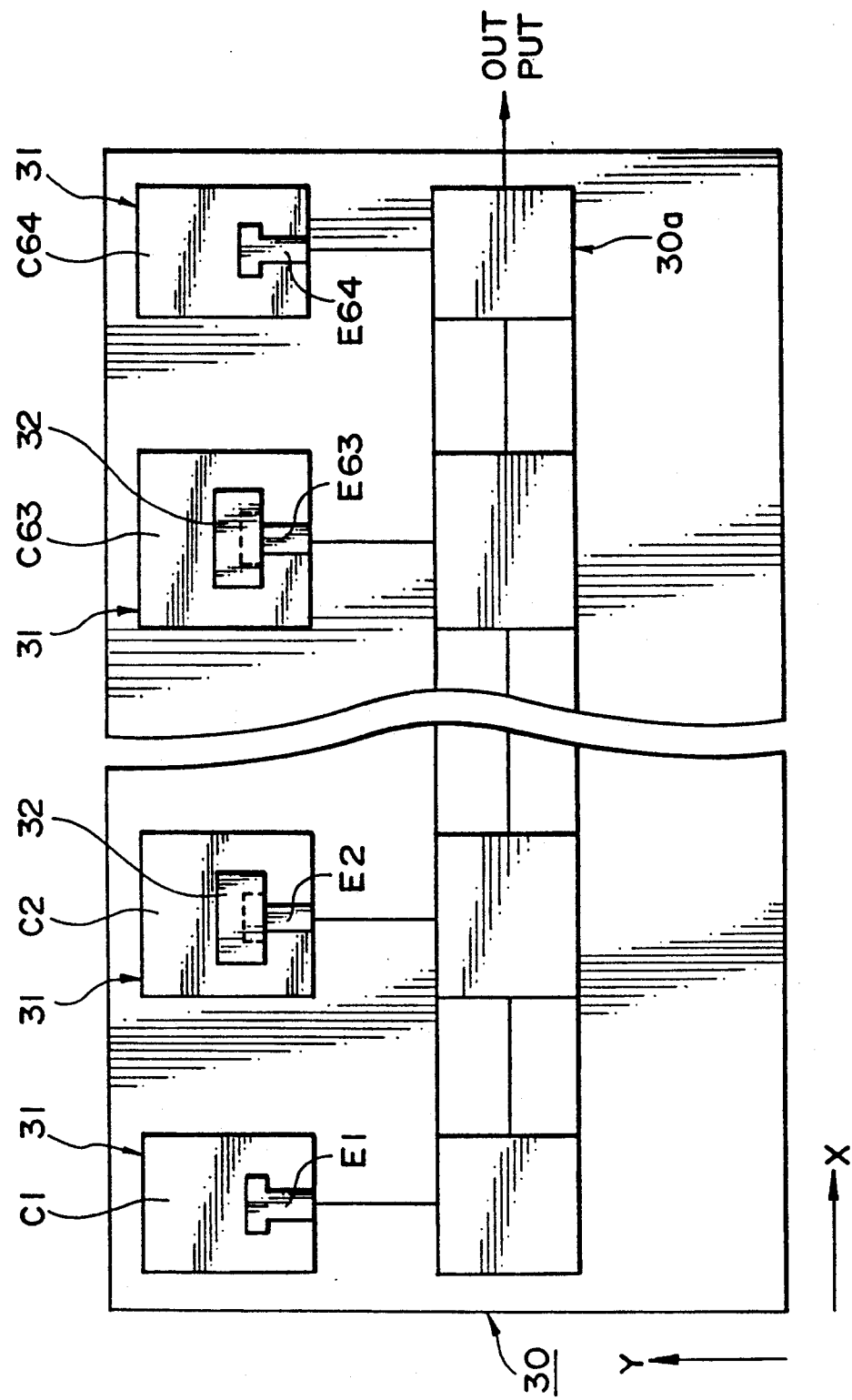
FIG. 4 is a plan view of a sensor IC constituting a light receptor to be mounted on an image sensor embodying this invention.

FIG. 4 is a plan view of the sensor IC 30. The sensor IC 30 is a multitip type in which, for example, 64 light receiving devices 31 corresponding to 64 pixels are arranged in the direction of operation. Inside the light receiving areas of the light receiving devices c1–c64, T-pattern electrodes E1–E64 are respectively formed. The reflected light from the image received by the light receiving devices are opto-electrically converted thereby. The electric charges are inputted to a shift register 30a from the electrodes E1–E64 and are then outputted in order from the shift register 30a as electrical signals. In every light receiving device c2–c63 except the light receiving devices c1 and c64, a part of the respective electrode E2–E63 and its peripheral portion are covered by a rectangular shield film 32 by means of aluminum evaporation. The individual light receiving device does not receive the reflected light through the shield light film 32. The light-receptive area of each of the light receiving devices c2–c63 is equal to the light-receptive area of each of the light receiving devices c1 and c64 so that every light receiving device c1–c64 has a uniform sensitivity. The shield film 32 is disposed substantially centrally in the light-receptive area so that the Y-direction pixel length of the individual light receiving device c2–c63 is equal to that of each light receiving device c1 and c64 at each end. Also the resolution in the sub-scanning direction will not be lowered. Since the shield film 32 is disposed near the center of each light receiving device, even the image crossing part of the individual light receiving device can be completely recognized.

Although the shield film 32 is rectangular in this embodiment, the shape may be circular, for example. Furthermore although the shield film 32 is formed by aluminum evaporation, the material and method should by no means be limited to this specific example.

Having this light receptor, the image sensor can eliminate any sensitivity fluctuation and resolution failure, which might occur during the production of sensor ICs.

Figure 5:
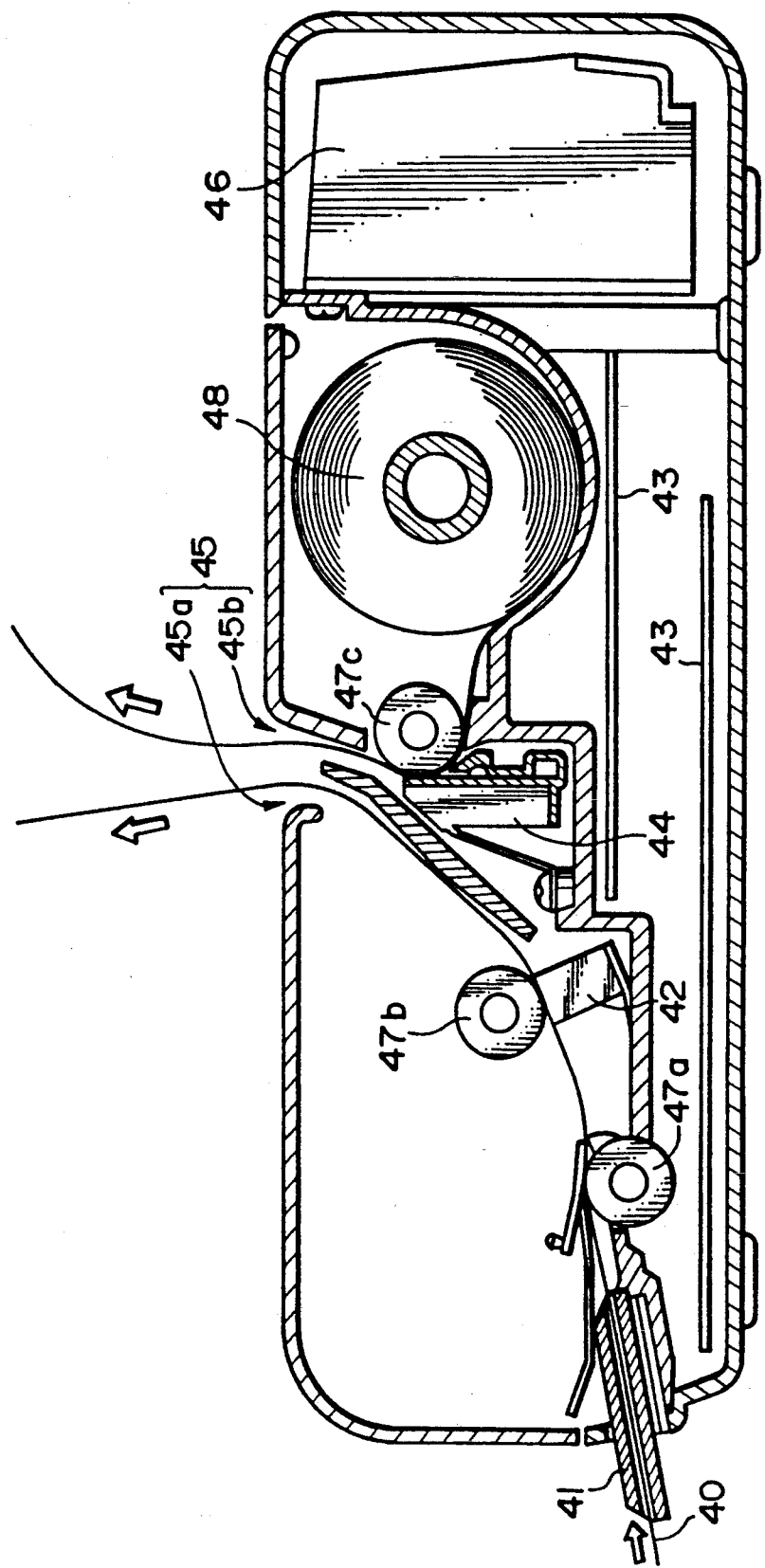
FIG. 5 is a fragmentary cross-sectional view of a facsimile machine equipped with the image sensor of the invention.

FIG. 5 shows the internal structure of a facsimile machine in which the image sensor having the foregoing construction is mounted.

The facsimile machine includes: a document supplier 41; an image sensor 42 as an image reader; a base plate 43 having a controller for controlling transmission, reception and the whole facsimile; a printer 44; a document discharger 45; and a power source 46.

In operation, when a document 40 is supplied from the document supplier 41, it is conveyed by platen rollers 47a, 47b. At that time, the image of the document is read by the image sensor 42, and then the image sensor 42 outputs the image information in the form of electrical signals to the controller. The electrical signals inputted to the controller are then transmitted to the distant destination via a telephone line or the like. The document whose image has been completely read will then be discharged from the document discharger 45a.

Further, when the controller receives the signals transmitted from outside, it controls the printer 44 to print the received image on a printing paper 48. The printed paper 48 will then be discharged from the document discharger 45 by the platen roller 47c.

By mounting the image sensor of this invention in the foregoing facsimile machine, it is possible to make the facsimile free from any fluctuation in light-receiving sensitivity and it is possible to obtain an image with no resolution failure.

What is claimed is:

1. An image sensor for applying light to an objective and receiving reflective light from the objective to obtain an image of the objective as electrical signals, comprising:
   a. a frame having in its top portion an opening;
   b. a transparent cover mounted on said top portion of said frame for supporting the objective;
   c. a light emitter mounted in said frame for applying light to the objective via said transparent cover to produce reflected light;
   d. a condenser lens mounted in said frame for receiving the reflected light from the objective via said transparent cover and for condensing the received light; and e. a light receptor mounted in said frame for receiving the light from said condenser lens and converting the received light into electrical signals, said light receptor including an array of sensor ICs, each of said sensor ICs having a plurality of light receiving devices, each of which has a light receiving area; and f. shield means positioned centrally in the light receiving area of each of a subplurality of the individual light receiving devices.

2. An image sensor according to claim 1, wherein each light receiving device comprises an electrode disposed inside said light receiving area and a peripheral portion associated with said electrode.

3. An image sensor according to claim 1, wherein said shield film is formed by aluminum evaporation.

4. An image sensor according to claim 2, wherein said shield film is formed by aluminum evaporation.

5. An electronic apparatus having an image sensor for applying light to an objective and receiving reflected light from the objective to obtain an image of the objective as electrical signals, said image sensor in the apparatus comprising:

a. a frame having in its top portion an opening;

b. a transparent cover mounted on said top portion of said frame for supporting the objective;

c. a light emitter mounted in said frame for applying light to the objective via said transparent cover to produce reflected light;

d. a condenser lens mounted in said frame for receiving the reflective light from the objective via said transparent cover and condensing the received light; and e. a light receptor mounted in said frame for receiving the light from said condenser lens and converting the received light into electrical signals, said light receptor including an array of sensor ICs, each of said sensor ICs having a plurality of light receiving devices, each of which has a light receiving area; and f. shield means positioned centrally in the light receiving area of each of a subplurality of the individual light receiving devices.

6. An electronic apparatus according to claim 5, wherein said shield film is constituted by both an electrode disposed inside said light receiving area and a peripheral portion associated with said electrode.

7. An electronic apparatus according to claim 5, wherein said shield film is formed by aluminum evaporation.

8. An electronic apparatus according to claim 6, wherein said shield film is formed by aluminum evaporation.

9. An electronic apparatus according to claim 5, wherein said electronic equipment is a facsimile machine.

10. An image sensor according to claim 1 wherein the plurality of light receiving devices includes two end devices and interior devices, the subplurality being at least some of the interior devices.

11. An image sensor according to claim 10 wherein the subplurality is all of the interior devices.

12. An image sensor for applying light to an objective and for receiving reflective light from the objective to obtain an image of the objective as electrical signals, the sensor comprising:

a frame having an opening;

a light emitter mounted in the frame for applying light through the opening to the objective to produce reflected light;

a light receptor which receives the reflected light and converts the received light into electrical signals, the light receptor including a plurality of light receiving devices, each having light receiving areas defined by an outer perimeter; and a shield film located in the light receiving area of a number of the light receiving devices, the shield film being positioned over each of the number of light receiving areas so that the film does not touch the outer perimeter of the light receiving area.

13. An image sensor according to claim 12 wherein the plurality of light receiving devices includes two end devices and interior devices, the numbers of devices being a plurality of the interior devices.

14. An image sensor according to claim 13 wherein the number is the number of all of the interior devices.

* * * * *